(12) United States Patent
Flockhart et al.

(10) Patent No.: US 6,732,188 B1
(45) Date of Patent: May 4, 2004

(54) METHOD FOR PROVIDING CUSTOMER TREATMENT BASED ON SPECIFIED RULES IN CONJUNCTION WITH NETWORK SOURCE ADDRESS OF A REQUEST ORIGINATOR

(75) Inventors: Andrew Derek Flockhart, Thornton, CO (US); Robin H. Foster, Little Silver, NJ (US); Eugene P. Mathews, Barrington, IL (US); John Z. Taylor, Bedminster, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/461,903

(22) Filed: Dec. 15, 1999

(51) Int. Cl.[7] .......................... G06F 15/16; G06F 15/173
(52) U.S. Cl. ........................................ 709/245; 709/223
(58) Field of Search ................................ 709/223, 245, 709/246, 247, 248, 249

(56) References Cited

U.S. PATENT DOCUMENTS

| | | | |
|---|---|---|---|
| 5,537,470 A | | 7/1996 | Lee |
| 5,724,412 A | | 3/1998 | Srinivasan |
| 5,793,861 A | | 8/1998 | Haigh ......................... 257/693 |
| 5,867,495 A | | 2/1999 | Elliott et al. ................. 370/352 |
| 5,884,032 A | | 3/1999 | Bateman et al. ............ 709/204 |
| 5,899,980 A | | 5/1999 | Wilf et al. ..................... 705/26 |
| 5,918,213 A | | 6/1999 | Bernard et al. ............... 705/26 |
| 6,006,272 A | * | 12/1999 | Aravamudan et al. ...... 709/245 |
| 6,047,325 A | * | 4/2000 | Jain et al. .................... 709/227 |
| 6,061,798 A | * | 5/2000 | Coley et al. |
| 6,147,976 A | * | 11/2000 | Shand et al. |
| 6,157,950 A | * | 12/2000 | Krishnan .................... 709/223 |
| 6,192,114 B1 | * | 2/2001 | Council |
| 6,195,706 B1 | * | 2/2001 | Scott ........................... 709/245 |
| 6,233,616 B1 | * | 5/2001 | Reid ........................... 709/225 |
| 6,324,578 B1 | * | 11/2001 | Cox et al. ................... 709/223 |
| 6,393,488 B1 | * | 5/2002 | Araujo ....................... 709/245 |

FOREIGN PATENT DOCUMENTS

| | | |
|---|---|---|
| DE | 196 44 2109 A1 | 4/1997 |
| EP | 0 755 144 A2 | 1/1997 |
| EP | 0 781 016 A2 | 6/1997 |
| WO | WO 97/28635 | 8/1997 |

* cited by examiner

Primary Examiner—Rupal Dharia
Assistant Examiner—Quang Nguyen
(74) Attorney, Agent, or Firm—Ryan, Mason & Lewis, LLP

(57) ABSTRACT

A call center or other processing system receives an incoming communication over a computer network, determines at least a portion of a network source address of the originator, and utilizes information from the source address to select a particular type of treatment for the communication. The computer network may be an Internet Protocol (IP) network and the network source address may be an IP source address. The communication may be a service request delivered from the originator to a call center over the Internet. The source address may be processed to determine, e.g., a particular individual corresponding to the originator, or a company name, company size, Internet service provider, geographic region, or other characteristic associated with the originator. This information is then used to determine how the communication will be handled, e.g., provided with service within a designated time, handled by an agent having particular skills, etc. The source address may also be used to control subsequent activation of live agent support icons presented via a web page. Advantageously, the invention allows more efficient handling of communications received over the Internet by allowing a call center to provide appropriate customer treatment for such communications.

15 Claims, 3 Drawing Sheets

METHOD FOR PROVIDING CUSTOMER TREATMENT BASED ON SPECIFIED RULES IN CONJUNCTION WITH NETWORK SOURCE ADDRESS OF A REQUEST ORIGINATOR

FIELD OF THE INVENTION

The present invention relates generally to call centers and other types of communication processing systems, and more particularly to systems which process communications received over a network, such as the Internet or other type of computer network.

BACKGROUND OF THE INVENTION

Call centers distribute calls and other types of communications, e.g., e-mails, faxes, voice messages, text messages, Internet service requests, etc. to available service agents, in accordance with various predetermined criteria. It is becoming increasingly important that call centers be able to provide an appropriate level of customer contact treatment based upon the relationship and value a particular customer has to the business. Businesses are looking to support their customer segmentation strategies regardless of the form of contact a customer may choose to obtain service. Many customers are choosing alternate forms of contact into a business, particularly web-based contact over the Internet or other Internet Protocol (IP) network, and companies need to provide the appropriate treatment when customers choose such alternative contact media. More particularly, companies should be able to provide the best agent resource for a given customer should the customer choose to access the call center through an Internet connection. In addition, the customer should receive a level of service comparable to that provided if the customer had accessed the call center via a conventional voice connection.

Conventional techniques for determining customer treatment for communications received over IP networks generally require proprietary data about the originator to be embedded in the body of one or more packets. Unfortunately, such an approach is unduly complex and may be difficult to implement in many applications. Other techniques simply do not attempt to determine customer treatment for communications of this type. For example, customers that access a call center through the Internet may be provided service based upon a first-in, first-out (FIFO) model that is highly dependent on the arrival patterns of customer requests.

Existing call centers thus have difficulty handling communications received over IP networks with the same consistency and precision as voice calls. For example, voice calls from particular customers or groups of customers can be identified by a number of criteria, such as Automatic Number Identification (ANI), collected customer digits, or specialized 800 numbers, thereby allowing companies significant flexibility in determining how to prioritize and deliver the appropriate service. However, such techniques are generally not directly applicable to communications received over IP networks. Multiple Internet requests for service arriving at a call center will therefore generally all be handled in the same manner, due to the lack of distinguishing information available about the request originator.

SUMMARY OF THE INVENTION

The invention provides improved techniques for processing incoming network-based service requests and other communications in a call center or other type of processing system. In accordance with the invention, an incoming communication is received over a computer network, at least a portion of a network source address of the originator is determined, and information from the source address is utilized to select a particular type of treatment for the communication.

The computer network may be an Internet Protocol (IP) network and the network source address may be an IP source address. The communication may be a service request delivered from the originator to a call center over the Internet. The source address may be processed to determine, e.g., a particular individual corresponding to the originator, or a company name, company size, Internet service provider, geographic region, or other characteristic associated with the originator. Other examples of information that can be determined using the network source address include the internal or external status of the communication, and whether the communication is a business-to-business or home-to-business communication. In addition, information such as purchase history, profitability, perceived value, customer name and non-IP contact information can be stored or otherwise associated with the source address of a given originator.

These and other types of information determined from the source address of the originator can then be used to determine how the communication will be handled, e.g., provided with service within a designated time, handled by an agent having particular skills, etc.

In accordance with another aspect of the invention, a particular type of customer treatment provided based at least in part on source address includes a live agent support icon presented to a user via a web page. The activation of the live agent support icon is controlled via a set of rules specifying, e.g., particular users that will see the icon, particular pages, times, etc. for which the icon will be presented, agent staffing levels or skill requirements, etc. These rules control whether and how live agent support will be offered to particular users, such that a call center will not inadvertently overextend itself.

Advantageously, the invention allows more efficient handling of communications received over the Internet by allowing a call center to provide more appropriate customer treatment. Using the invention, consistent and precise customer treatment similar to that provided for voice calls can be provided for Internet service requests and other similar network-based communications received in a call center. These and other features and advantages of the present invention will become more apparent from the accompanying drawings and the following detailed description.

DETAILED DESCRIPTION OF THE INVENTION

Although the invention will be illustrated below in conjunction with the processing of Internet Protocol (IP) communications received in an exemplary call center, it is not limited to use with any particular type of call center or communication processing application. For example, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, etc. The term "call center" as used herein is thus intended to include any type of ACD system, telemarketing system or other communication system which processes calls or other service requests, including voice calls, video calls, multimedia calls, e-mail, faxes, text chat or voice messages as well as various portions or combinations of these and other types of communications. The terms "call" or "service request" as used herein are intended to include any of the above-noted types of communications as well as portions or combinations of these and other communications.

The present invention in the illustrative embodiments to be described below utilizes an IP source address of an originator of a service request as a basis for determining customer treatment for that service request in a call center. The customer treatment may include factors such as, e.g., how long the request will wait for service, what agent resources will be assigned to process the request, and what announcements will be provided. The IP source address can be used to determine, e.g., a general geographical location, company or individual corresponding to the request originator.

In the illustrative embodiments, the IP address of the originator may be captured during a qualification stage of the customer interaction, and utilized as a basis for providing more individualized customer treatment. For example, by knowing that the IP source address of a service request originator is outside of the domestic market, a multilingual agent can be selected for handling the request. Another example may be based on time zone differentials, i.e., by knowing the request for service is coming from a different time zone, a business may elect to provide a different type of resource to handle the request.

Figure 1:
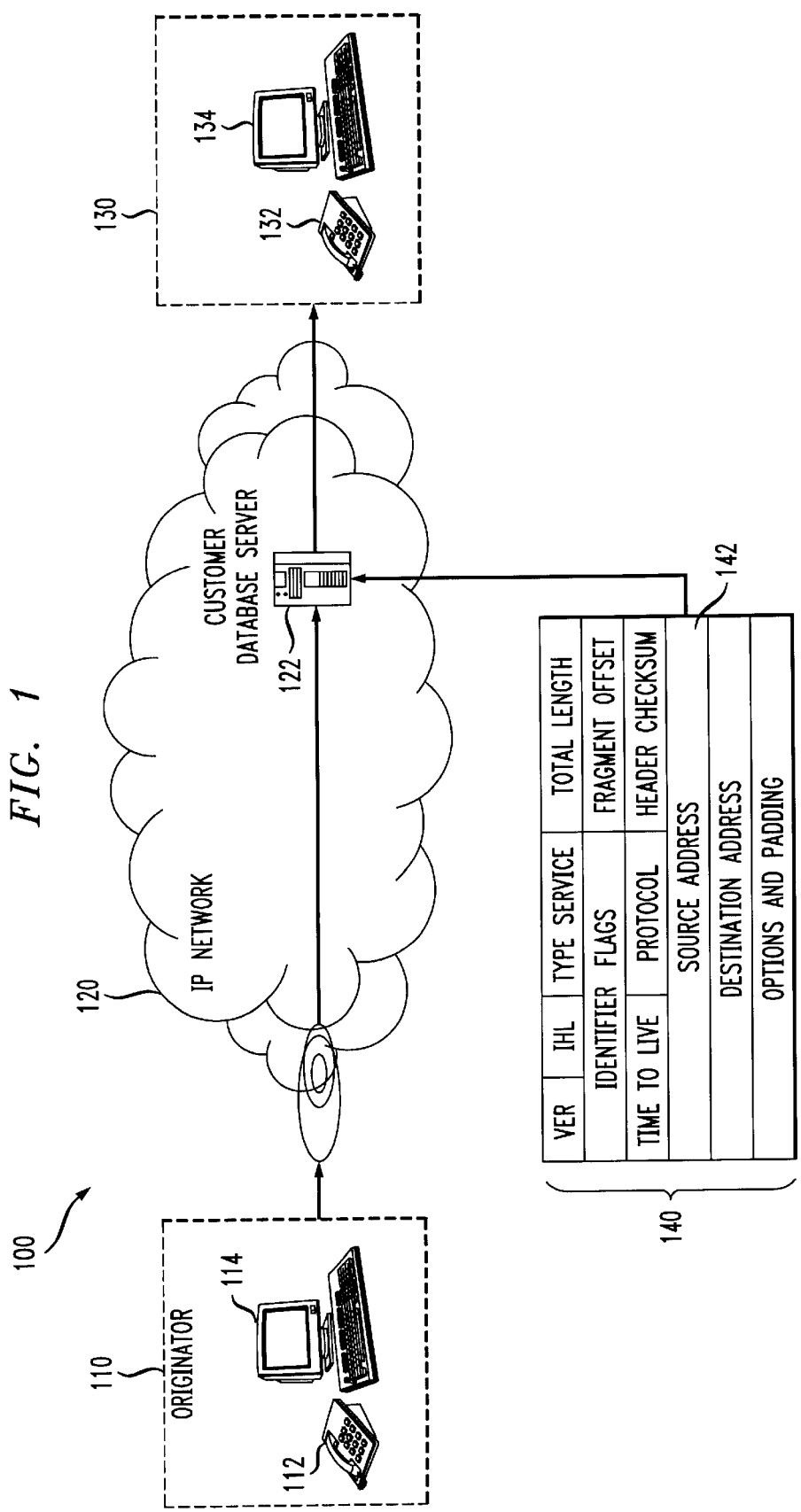
FIG. 1 is a block diagram of an exemplary communication system in accordance with a first embodiment of the invention.

FIG. 1 shows a communication system 100 in accordance with a first illustrative embodiment of the invention. The system 100 includes a service request originator 110 which in this embodiment comprises a telephone 112 and a computer 114. The originator 110 communicates over an IP network 120. The network 120 includes a customer database server 122 which communicates with a service provider 130. The service provider 130 in this embodiment includes a telephone 132 and a computer 134, and may represent an agent workstation in a call center, or other type of call center processing equipment. The service provider 130 is assumed to be incorporated in or otherwise associated with a call center configured to handle service requests from multiple originators, transmitted over a variety of different media, including, e.g., conventional voice telephone lines, e-mail connections, etc.

It should be noted that the particular configuration of originator 110, network 120 and service provider 130 shown in FIG. 1 is by way of example only, and numerous other configurations could be used. For example, the originator 110 may comprise only telephone 112 or computer 114, or may be, e.g., a palmtop or other portable computer, a personal digital assistant (PDA), a web-enabled wireless telephone, or any other device capable of communicating over the IP network 120. In addition, the service provider 130 may include multiple computers, workstations or other processor-based devices in a wide variety of conventional configurations. As another example, the customer database server 122 may be co-located with the service provider 130, rather than incorporated in or otherwise associated with the IP network 120.

In operation, a user associated with the originator 110 makes a request for service over the IP network 120. The request is transmitted in the form of one or more IP packets delivered from the originator 110 to the customer database server 122. The customer database server 122 analyzes the source address of at least one of the IP packets, using class and net-mask techniques to be described below in conjunction with FIG. 3, in order to determine additional information regarding the originator. For example, the source address may be used to cross-reference information in a customer database, in order to determine a geographic area, company or individual associated with that source address. The service provider 130 then uses this information as received from the customer database server 122 to determine an appropriate treatment for the service request, e.g., a shorter wait time for a preferred customer, a particular agent with special skills for handling a request from a particular geographic area, etc.

Also shown in FIG. 1 is a header 140 of a given IP packet received by customer database server 122 from the originator 110 over the IP network 120. The header 140 is configured in accordance with IP Version 4 (IPV4), but other versions could also be used, e.g., Version 6 (IPV6). The header 140 includes a source address 142, that is processed by the customer database server 122 in the manner previously described. The header further includes additional information configured in a well-known manner, including a destination address, options and padding information, and fields for Ver, IHL, Type Service, Total Length, Identifier Flags, Fragment Offset, Time to Live, Protocol and Header Checksum. The meaning and functionality of this additional information in the header 140 are well known in the art and therefore not described in detail herein.

Figure 2:
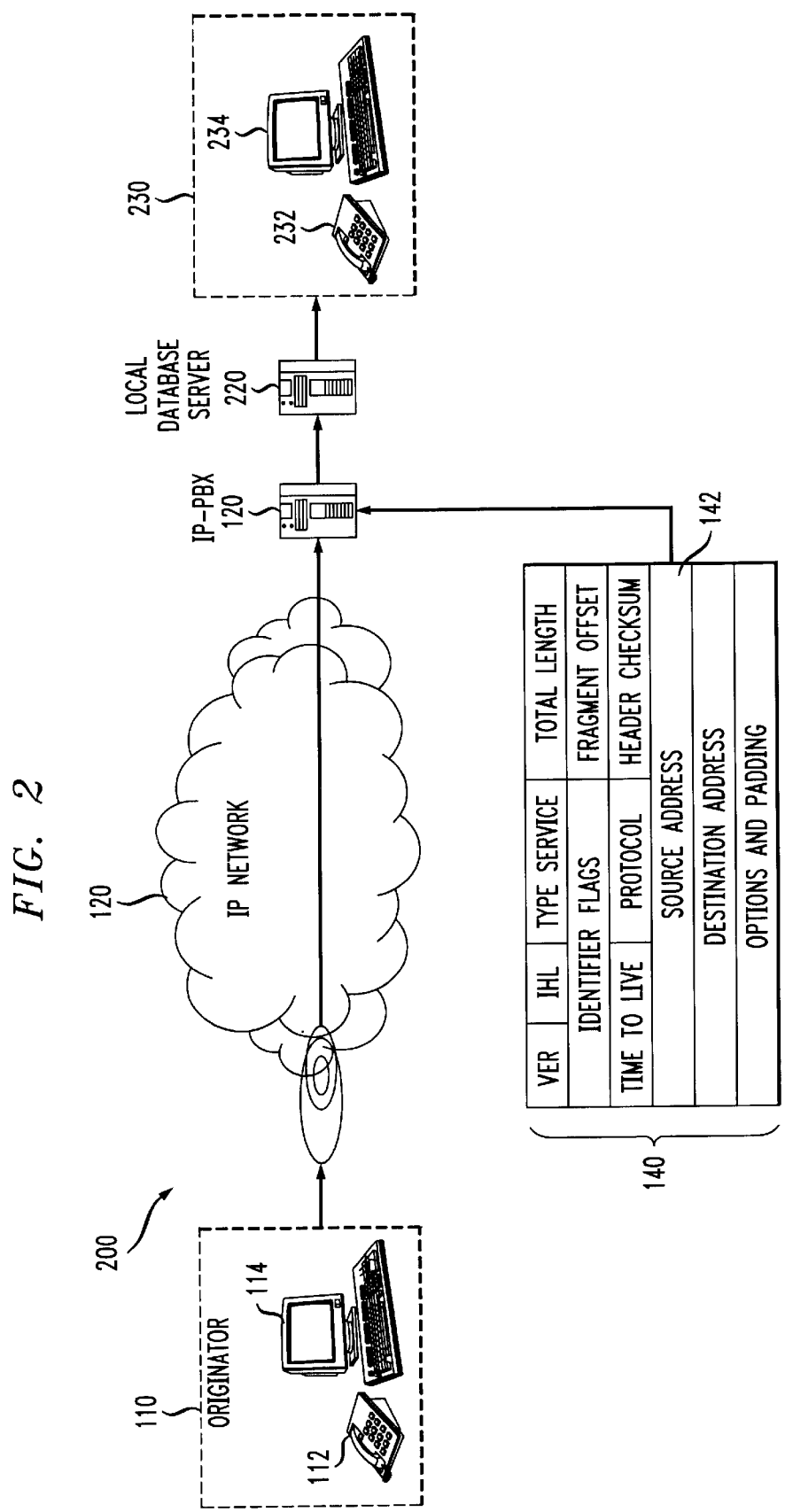
FIG. 2 is a block diagram of an exemplary communication system in accordance with a second embodiment of the invention.

FIG. 2 shows a communication system 200 in accordance with a second illustrative embodiment of the invention. The system 200 includes service request originator 110, comprising telephone 112 and computer 114, and IP network 120, as previously described. The system 200 further includes a IP-PBX 210 which communicates with a local database server 220 and a service provider 230. The IP-PBX 210 represents an IP-compatible PBX which may be part of a call center. The service provider 230 in this embodiment includes a telephone 232 and a computer 234, and may represent an agent workstation in a call center, or other type of call center processing equipment. Like the service provider 130 of FIG. 1, the service provider 230 is assumed to be incorporated in or otherwise associated with a call center configured to handle service requests from multiple originators, transmitted over a variety of different media, including, e.g., conventional voice telephone lines, e-mail connections, etc.

As in the FIG. 1 embodiment, the particular configuration of elements 210, 220 and 230 as shown in FIG. 2 is by way of example only, and numerous other configurations could be used. For example, like the service provider 130 of FIG. 1, the service provider 230 may include multiple computers, workstations or other processor-based devices in a wide variety of conventional configurations.

In operation, a user associated with the originator 110 of FIG. 2 makes a request for service over the IP network 120. The request is transmitted in the form of one or more IP packets delivered from the originator 110 to the IP-PBX 210. The IP-PBX 210 analyzes the source address 142 of at least one of the IP packets, using class and net-mask techniques to be described below in conjunction with FIG. 3. Operating in conjunction with the local database server 220, the IP-PBX determines additional information regarding the originator, e.g., a geographic area, company or individual associated with that source address. The IP-PBX 210 then routes the communication to the service provider 230, which in this embodiment represents a service provider selected to provide an appropriate treatment for the service request based on the information determined from the originator source address. As previously noted, examples of such treatment include, e.g., a shorter wait time for a preferred customer, a particular agent with special skills for handling a request from a particular geographic area, etc.

Figure 3:
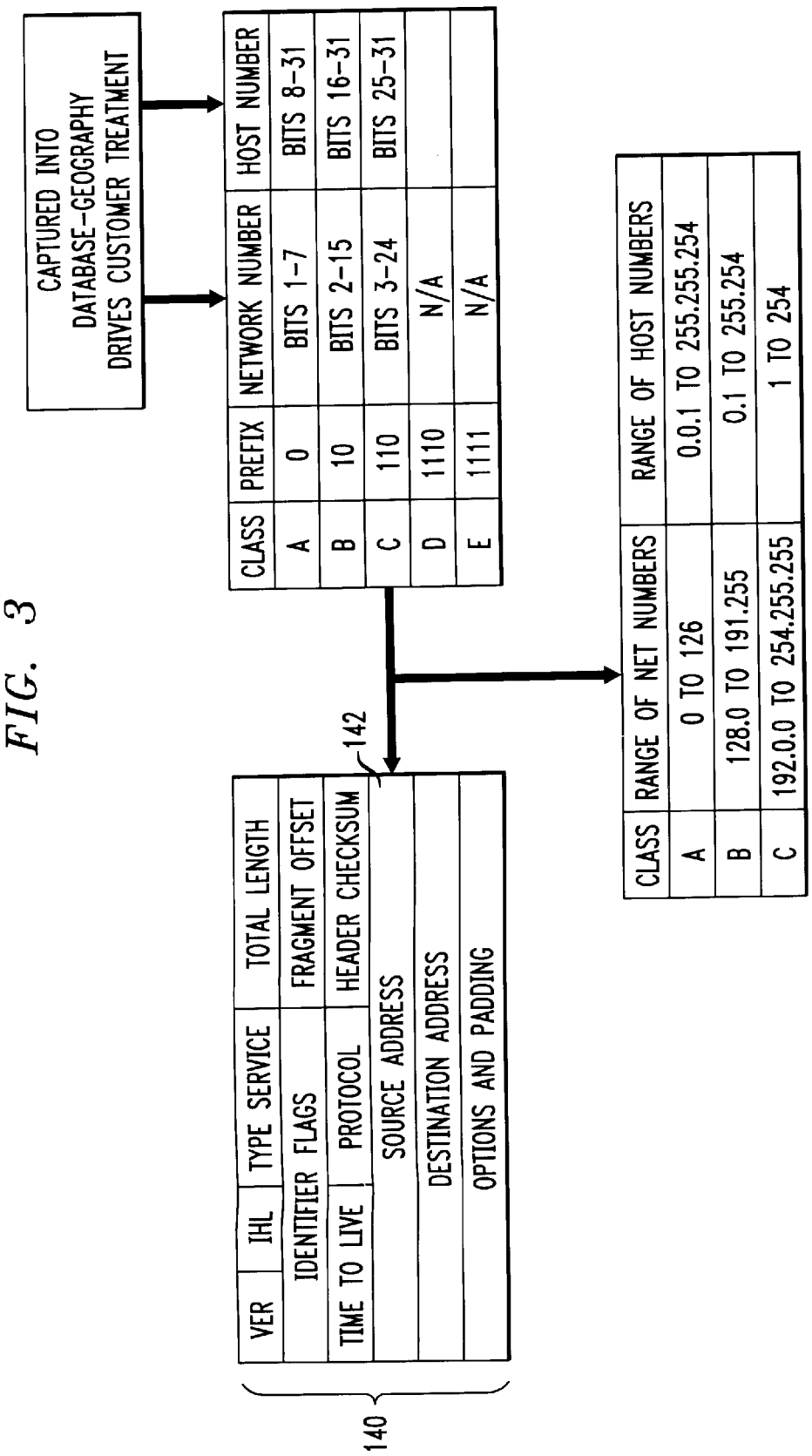
FIG. 3 illustrates in greater detail the processing of IP source address information in accordance with the invention.

FIG. 3 illustrates an example of the processing of the source address 142 as implemented in the systems of FIGS. 1 and 2. In this example, it is assumed without limitation that the possible source addresses include at least three classes A, B and C. Classes A, B and C include prefixes 0, 10 and 110, respectively. Prefixes 1110 and 1111 correspond to potential classes D and E that are not applicable to this particular example. In general, class A IP addresses are intended for large companies with very large networks, class B for medium-sized companies, and class C for small companies.

Associated with each of the classes A, B and C is a corresponding network number and host number. More specifically, class A includes a range of network numbers 0 to 126 identified by bits 1–7 of the source address 142, and a range of host numbers 0.0.1 to 255.255.254 identified by bits 8–31 of the source address 142. Similarly, class B includes a range of network numbers 128.0 to 191.255 identified by bits 2–15 of the source address 142, and a range of host numbers 0.1 to 255.254 identified by bits 16–31 of the source address 142, and class C includes a range of network numbers 192.0.0 to 254.255.255 identified by bits 3–24 of the source address 142, and a range of host numbers 1 to 254 identified by bits 25–31 of the source address 142.

In accordance with the invention, the network number and host number of the source address 142 are captured into a database, e.g., a database associated with customer database server 122 of FIG. 1 or local database server 220 of FIG. 2, and utilized to determine geographic or other information regarding the originator. This geographic or other information is in turn used to drive or otherwise determined a particular type of customer treatment that will be provided for the originator. For example, the source address 142 may be used to determine the particular class associated with the originator, and a certain type of treatment provided for the originator based on the determined class.

A number of specific examples will now be given of the operation of the systems of FIGS. 1 and 2 based on the IP source address processing illustrated in FIG. 3. It will be appreciated by those skilled in the art that these are examples only, and that many other types of operations can be performed to determine customer treatment based on originator source address in accordance with the invention.

1. Full IP Source Address. Measure sales, profitability or other information useful in determining appropriate customer treatment, and store the information in a database along with the full IP source address. For all incoming service requests, perform a database lookup in the manner described previously to determine the likelihood of purchase, profitability, value, etc. for the corresponding originator, and determine treatment based on this likelihood, e.g., an originator more likely to make a purchase has a shorter wait time for service. In one possible implementation of such a technique, the IP source address may be used to identify the specific customer.

2. Internal or External. Determine the class of the IP source address and apply an appropriate netmask for the class to extract the network number of the originator. Compare the extracted network number with the network number of the call center or other business enterprise receiving the service request in order to determine whether the service request is from an internal or external contact, and apply treatment accordingly.

3. Size of Company. Determine the class of the IP source address and use the class to determine the likely size of the company making contact. Apply treatment accordingly.

4. Company Name. Determine the class of the IP source address and apply an appropriate netmask for the class to extract the network number of the originator. Perform a database lookup to determine the name of the company associated with the originator. Apply treatment based on the value of this company to the business enterprise.

5. Internet Service Provider (ISP). Determine the class of the IP source address and apply an appropriate netmask for the class to extract the network number of the originator. Perform a database lookup to determine the ISP associated with the originator. Measure the sales, profitability, etc. of the customers associated with this ISP and store this information. For subsequent incoming service requests, perform a database lookup to determine likelihood of purchase, profitability, value, etc. for customers associated with the particular ISP, and determine treatment based on this likelihood.

6. Geography. Determine the class of the IP source address and apply an appropriate netmask to extract the network number of the originator. Perform a database lookup to determine the corresponding ISP and the geographical location of its users. Use this geographic location as a basis for determining customer treatment. For example, in an insurance industry application, route a service request from an originator in a particular state or country to an agent who is trained in the laws of that state or country. As another example, a service request from an originator in a particular geographic area can be routed to an agent with the appropriate language skills for that geographic area.

7. Business-to-business or Home-to-business. Determine the class of the IP source address and apply an appropriate netmask for the class to extract the network number of the originator. Perform a database lookup to determine if the extracted network number corresponds to an ISP or another type of business enterprise. Use this information to determine if the service request is a business-to-business contact or home-to-business contact, and treat accordingly.

Non-IP contact details can also be stored in association with a particular IP source address of a given originator. For example, if a particular communication from the originator is a voice-over-IP communication, any information gathered when an agent talks with the originator in servicing the voice-over-IP communication can be stored and associated with the corresponding IP address. Other examples of non-IP contact information include name, age, sex, previous contacts, etc. This non-IP information can be gathered using any desired type of conventional technique, such as prompting, cookies, etc.

In accordance with another aspect of the present invention, the source address of an originator can be used in conjunction with a set of rules to control activation of live agent support icons presented on web sites of a business or other enterprise. The Internet is essentially a self-service environment, but since it is globally accessible, the numbers of people wanting to access a live agent at any particular time could be many more than a given enterprise can handle.

Advantageously, rules-based activation of live agent support icons in accordance with the invention can prevent an enterprise from inadvertently over-extending its offers to provide customer help. For example, this aspect of the invention will prevent a situation in which Internet users may be seeing a "click to talk" button or other agent support icon when the corresponding business is "closed" for the night, i.e., there is no agent available to service the call. Or there may be days when the absence of certain employees depletes the ability of the business to staff the phones. In these and other situations, rules-based activation of the live agent support icons may be used to provide improve customer treatment, based at least in part on source address of an originator.

An example of a set of rules that may be used to control activation of live agent support icons includes the following:

1. A rule specifying the page(s) of a given web site on which the icon will be posted.
2. A rule specifying particular users of the web site for which the icon will be activated, based on information such as registration status, past buying history, current buying interests, etc. as associated with a source address of the user in the manner previously described.
3. A rule specifying particular times, e.g., local time at the enterprise location, user time, etc. for which the icon will be activated.
4. A rule specifying the activation of the icon based on factors such as the number of agents staffed to take calls, the number currently busy, etc.
5. A rule specifying activation of the icon based on the skills of the currently-available agents.
6. A rule specifying activation of the icon based on the likelihood of particular users taking advantage of the offer for assistance, in a manner similar to that used in conventional predictive outbound dialing applications to predict the number of launched calls which will be answered by real people.

These rules control whether and how live agent support will be offered to each user. The rules may change at any point during the viewing of a web site. For example, when a user first accesses the site, there may be no agent available to take live calls, such that no agent support icon is displayed. However, a few minutes later, one or more agents may have logged on to accept calls, such that the icon is then activated and made visible to the user. The presence of the live agent support icon is thus dependent on the established rules.

The rules-based activation may be based on a stored IP source address determined from a previous communication. Alternatively, the IP source address may be directly identified from a request for the corresponding web page. The term "communication" as utilized herein is intended to include such requests.

The rules-based activation of live agent support icons as described above may be implemented in a straightforward manner in the systems of FIGS. 1 and 2. For example, an icon of the type described may be presented on computer 114 as part of a web page retrieved by the originator over IP network 120. The rules may be controlled by appropriate processing and memory elements associated with system elements such as customer database server 122, service provider 130, IP-PBX 210, local database server 220, and service provider 230. As will be apparent to those skilled in the art, this aspect of the invention may also be implemented in a straightforward manner in numerous other types of systems.

It should again be emphasized that the above-described embodiments of the invention are intended to be illustrative only. For example, the exemplary configuration of the systems shown in FIGS. 1 and 2 may be altered to incorporate a wide variety of different arrangements of components to provide the processing functions described herein. In addition, as previously noted, the invention can be applied to a wide variety of communications other than IP communications, including faxes, e-mails, text chat, voice over IP, etc. Moreover, the invention can be applied to communications over other types of networks or communication media, including non-IP networks. It should also be noted that the invention may be implemented in the form of a computer-readable medium or other similar medium containing software which, when executed by a computer or other type of processor, will cause the processor to implement the processing functions described above. Furthermore, a call center configured in accordance with the invention may be distributed over multiple sites. For example, the processing operations described above may be performed in a remote or centralized system before a given call or other communication is delivered to an available agent at a particular local site. These and numerous other alternative embodiments within the scope of the following claims will be apparent to those skilled in the art.

What is claimed is:

1. A method of processing an incoming communication received over a computer network, the method comprising the steps of:
    determining at least a portion of a network source address associated with an originator of the communication; and
    selecting a particular type of treatment for the communication based at least in part on the determined portion of the source address;
    wherein the determined portion of the source address is utilized in conjunction with one or more specified rules to control the activation of a live agent support icon presentable to the originator of the communication via a web page, the live agent support icon thereby being controllable between an activated state, in which the live agent support icon is presented to the originator via the web page, and an inactivated state, in which the live agent support icon is not presented to the originator via the web page, based at least in part on the determined portion of the source address.

2. The method of claim 1 wherein the computer network comprises an Internet Protocol (IP) network and the network source address comprises an IP source address.

3. The method of claim 1 wherein the communication comprises a service request delivered from the originator to a call center over the computer network.

4. The method of claim 1 wherein a full network source address for the originator is determined and stored in conjunction with additional information relating to at least one of a purchase history measure, a profitability measure, a perceived value, a customer name and non-IP contact information associated with the originator.

5. The method of claim 1 wherein the network source address of the originator is determined at least in part using a database server associated with the computer network.

6. The method of claim 1 wherein the network source address of the originator is determined at least in part using a database server associated with a call center.

7. The method of claim 1 wherein the network source address determined for the originator comprises at least one of a network number and a host number.

8. The method of claim 1 wherein a netmask is applied to at least a portion of the network source address in order to extract therefrom at least one of a network number and a host number.

9. The method of claim 1 further including the step of determining which of a plurality of different classes of network source addresses includes the network source address of the originator, and wherein the treatment for the communication is determined at least in part based on the class of the network source address.

10. A method of processing an incoming communication received over a computer network, the method comprising the steps of:

determining at least a portion of a network source address associated with an originator of the communication; and selecting a particular type of treatment for the communication based at least in part on the determined portion of the source address;

wherein the determining and selecting steps are configured so as to provide at least one of the following functions:

(i) the network source address is used to determine whether the communication is an internally-originated or an externally-originated communication relative to an enterprise associated with a call center, and the selection of a treatment for the communication is based at least in part on the internally-originated or externally-originated status of the communication;

(ii) the network source address is used to determine at least one of a size and a name of a company associated with the originator, and the selection of a treatment for the communication is based at least in part on the at least one of the company size and company name;

(iii) the network source address is used to determine an Internet service provider associated with the originator, and the selection of a treatment for the communication is based at least in part on the determined Internet service provider;

(iv) the network source address is used to determine a geographic region associated with the originator, and the selection of a treatment for the communication is based at least in part on the determined geographic region; and (v) the network source address is used to determine whether the communication is a business-to-business or a home-to-business communication, and the selection of a treatment for the communication is based at least in part on the business-to-business or home-to-business status of the communication.

11. The method of claim 1 wherein the communication comprises an access to a web page associated with a call center.

12. An apparatus for processing an incoming communication received over a computer network, the apparatus comprising:

at least one processor-based device operative: (i) to determine at least a portion of a network source address associated with an originator of the communication; and (ii) to select a particular type of treatment for the communication based at least in part on the determined portion of the source address;

wherein the determined portion of the source address is utilized in conjunction with one or more specified rules to control the activation of a live agent support icon presentable to the originator of the communication via a web page, the live agent support icon thereby being controllable between an activated state, in which the live agent support icon is presented to the originator via the web page, and an inactivated state, in which the live agent support icon is not presented to the originator via the web page, based at least in part on the determined portion of the source address.

13. The apparatus of claim 12 wherein the at least one processor-based device comprises a database server associated with the computer network.

14. The apparatus of claim 12 wherein the at least one processor-based device comprises a PBX and a database server associated with a call center.

15. A machine-readable medium storing one or more programs for use in processing an incoming communication received over a computer network, wherein the one or more programs when executed by a processor implement the steps of:

determining at least a portion of a network source address associated with an originator of the communication; and selecting a particular type of treatment for the communication based at least in part on the determined portion of the source address;

wherein the determined portion of the source address is utilized in conjunction with one or more specified rules to control the activation of a live agent support icon presentable to the originator of the communication via a web page, the live agent support icon thereby being controllable between an activated state, in which the live agent support icon is presented to the originator via the web page, and an inactivated state, in which the live agent support icon is not presented to the originator via the web page, based at least in part on the determined portion of the source address.

* * * * *

UNITED STATES PATENT AND TRADEMARK OFFICE
CERTIFICATE OF CORRECTION

PATENT NO. : 6,732,188 B1
DATED : May 4, 2004
INVENTOR(S) : Flockhart et al.

It is certified that error appears in the above-identified patent and that said Letters Patent is hereby corrected as shown below:

Column 9,
Line 17, Claim 10, should read as follows:
   The method of claim 1
   wherein the determining and selecting steps are configured so as to provide at least one of the following functions:

(i) the network source address is used to determine whether the communication is an internally-originated or an externally-originated communication relative to an enterprise associated with a call center, and the selection of a treatment for the communication is based at least in part on the internally-originated or externally-originated status of the communication;

(ii) the network source address is used to determine at least one of a size and a name of a company associated with the originator, and the selection of a treatment for the communication is based at least in part on the at least one of the company size and company name;

(iii) the network source address is used to determine an Internet Service Provider associated with the originator, and the selection of a treatment for the communication is based at least in part on the determined Internet Service Provider;

(iv) the network source address is used to determine a geographic region associated with the originator, and the selection of a treatment for the communication is based at least in part on the determined geographic region; and (v) the network source address is used to determine whether the communication is a business-to-business or a home-to-business communication, and the selection of a treatment for the communication is based at least in part on the business-to-business or a home-to-business status of the communication.

Signed and Sealed this

Twenty-fourth Day of August, 2004

JON W. DUDAS
*Director of the United States Patent and Trademark Office*